Oct. 6, 1959      H. HURVITZ      2,907,622

OSCILLOGRAPHIC RECORDERS

Filed Feb. 12, 1957      5 Sheets-Sheet 1

INVENTOR.
Hyman Hurvitz

INVENTOR.
Hyman Hurvitz

INVENTOR.
Hyman Hurvitz
BY

Oct. 6, 1959

H. HURVITZ 2,907,622

OSCILLOGRAPHIC RECORDERS

Filed Feb. 12, 1957

INVENTOR.

Oct. 6, 1959 — H. HURVITZ — 2,907,622
OSCILLOGRAPHIC RECORDERS
Filed Feb. 12, 1957 — 5 Sheets-Sheet 5

INVENTOR.
Hyman Hurvitz

United States Patent Office 2,907,622
Patented Oct. 6, 1959

2,907,622

OSCILLOGRAPHIC RECORDERS

Hyman Hurvitz, Washington, D.C.

Application February 12, 1957, Serial No. 639,811

21 Claims. (Cl. 346—74)

The present invention relates generally to oscillographic recorders, and more particularly to multi-stylus oscillographic recorders.

It is an object of the present invention to provide a system of multi-stylus recorders capable of recording on voltage sensitive paper, which shall have high writing speed, high accuracy and low cost.

It is a further object of the invention to provide a system for simultaneously recording a plurality of analogue signals on the same area of the record receiver of a single recorder of the multi-stylus type.

It is another object of the invention to provide a system for biasing the styli of a multiple stylus recorder, in order to reduce the writing voltage required to be applied to the styli thereof.

Still another object of the invention resides in the provision of a system for writing on electro-sensitive recording paper in response to lower writing voltage and current than is normally required by the paper.

A further object of the invention resides in the provision of a multiple stylus recorder in which each stylus is driven from a separate filter, and in which the band widths of the filters may be radically reduced from that required for complete response of the filters to applied frequency modulated signal, where the recorded signal is in the form of frequency modulated signal.

Another object of the invention is to record by means of an electrode in contact with electro-sensitive paper, and in circuit with a resonant circuit, by commencing recording during rise of signal in the resonant circuit, and terminating recording without permitting the circuit to achieve full response.

Another object of the invention resides in the provision of a multi-stylus recorder, in which each stylus is associated with a resonant circuit for driving the stylus, and in which recording commences for each stylus just short of the point where the circuit attains maximum response to a driving signal.

It is another object of the invention to provide a novel system for coupling recording electrodes to a resonant circuit without unduly loading the circuit, and thereby reducing its Q factor.

Another object of the invention is to provide a system of multi-stylus recording in which the styli are each in circuit with a resonant circuit, the latter arranged in an array of overlapping band passes, and recording occurring in response to a frequency modulated carrier, the overlap being sufficient to energize each stylus circuit almost to writing voltage appreciably before writing is to occur at that stylus, whereby to reduce the effective band pass requirements of the filters, and to reduce the energy build up time per stylus, required to attain writing voltage.

It is another object of the invention to provide resonant circuits having overlap, for energizing recording styli, the overlap being sufficiently great that in response to frequency modulated recording signals the styli record in sequence but with appreciable overlap of recording time for adjacent styli.

Another object of the invention is to provide a multi-stylus recorder in which the supply of writing voltage may be controlled according to writing speed, where devices are provided for preventing burning of the record receiver, and where the styli are energized from filters for controlling filter Q in accordance with writing speed.

Another object of the invention resides in the provision of a system for recording on electro-sensitive material, wherein at least some of the recording current derives from D.-C. discharge of a condenser, initiated by slight breakdown of the recording paper in response to A.-C. writing current.

The above and still further objects, features and advantages of the present invention will become apparent upon consideration of the following detailed description of one specific embodiment thereof, especially when taken in conjunction with the accompanying drawings, wherein:

Figure 2 is a schematic circuit diagram of a modification of a writing and bias circuit employed in the system of Figure 1;

Figure 19:
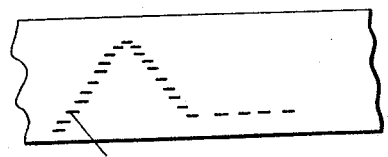
Figure 17:
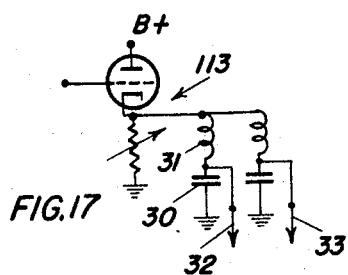
Figure 18:
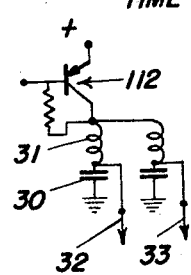
Figure 14:
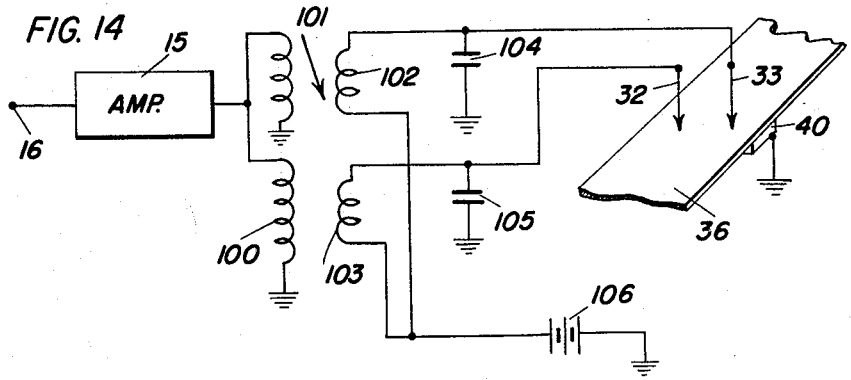
Figure 15:
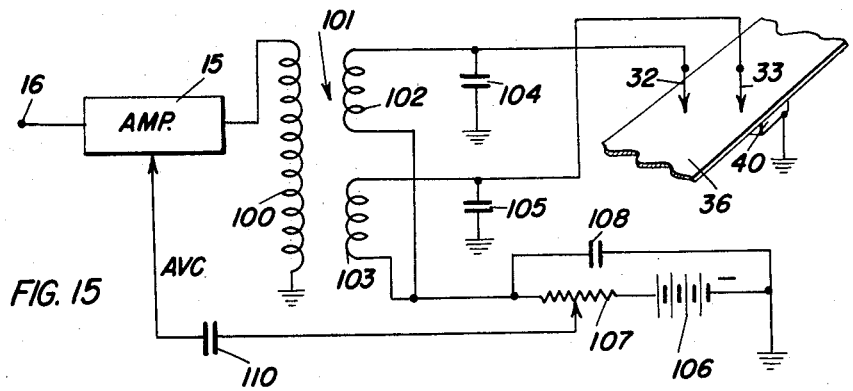
Figure 16:
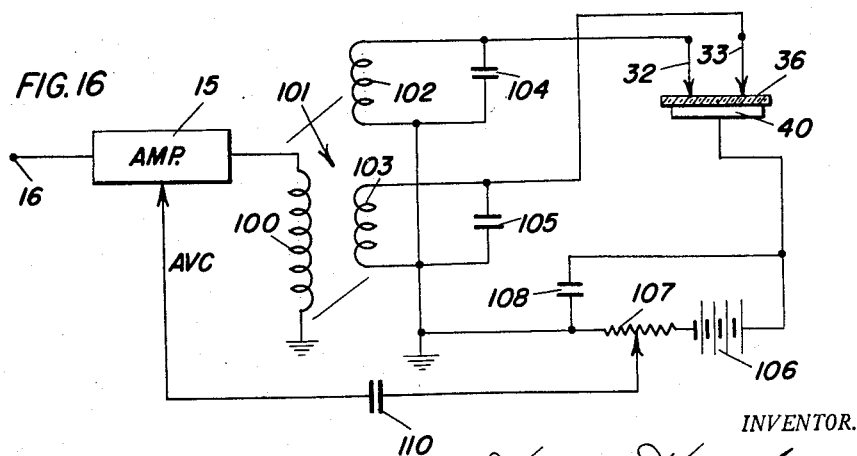

Figures 14–16, inclusive, illustrate schematically three forms of multi-stylus writing circuits having provision for D.-C. bias;

Figure 17 illustrates schematically a stylus energizing circuit employing a cathode follower driver;

Figure 18 illustrates a modification of the system of Figure 17, employing a transistor driver for the styli; and Figure 19 illustrates the character of the record produced according to the present system.

Figure 1:
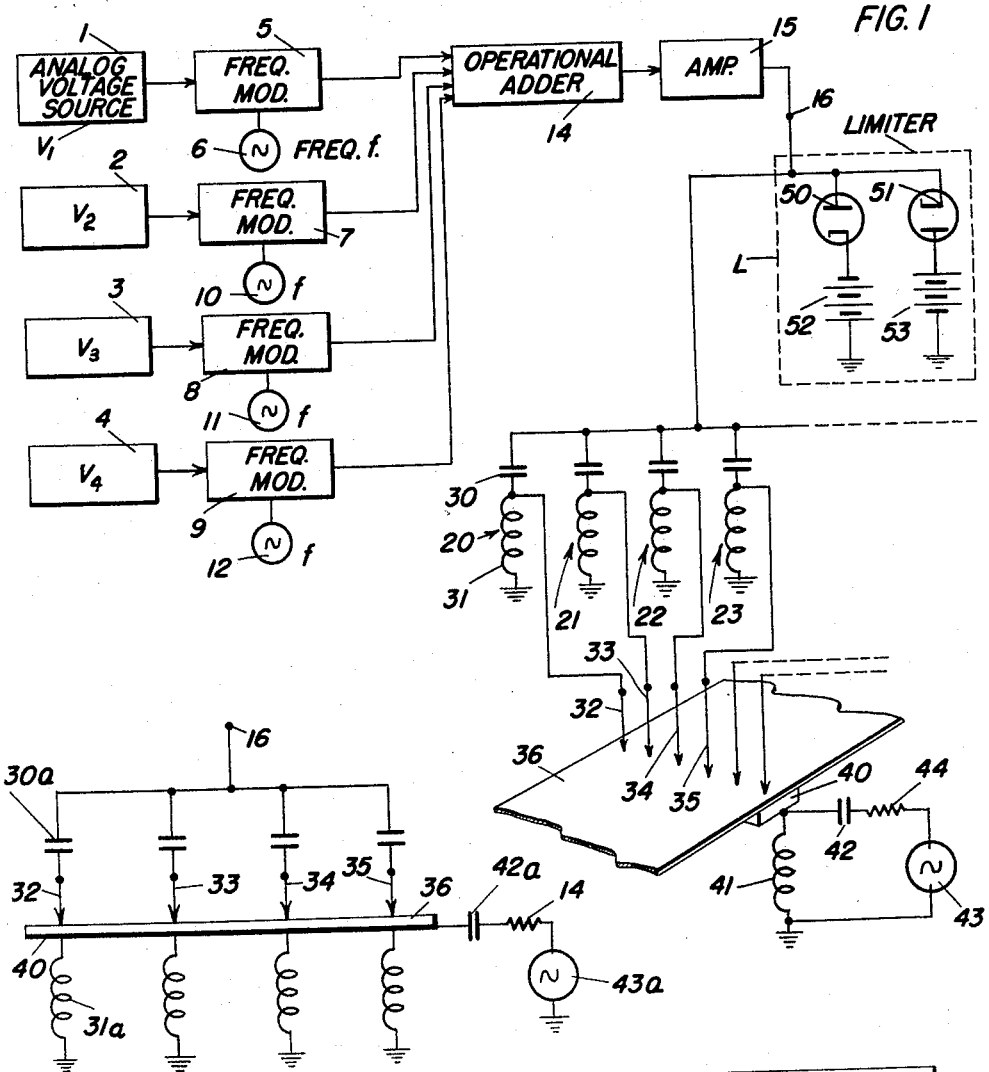
Figure 1 is a diagram of multiple stylus, multiple signal, recorder according to the invention.

Referring initially to Figure 1 of the accompanying drawings, the blocks 1, 2, 3 and 4 denote sources of amplitude varying analogue signal, as voltage, which are to be recorded. The several sources are independent but all fall within the same range of peak amplitudes, or may be made so to fall by means of attenuators, voltage dividers, or the like.

The signal supplied by source 1 is applied to a frequency modulator 5, supplied with radio frequency signal from an oscillator 6. The maximum frequency in the signal supplied by source 1 may be of the order of as high as 5 mc. while the source 6 may have a mean frequency of the order of 5 mc. The basis on which is selected the peak frequency deviations of the frequency $f$ of oscillator 6 will appear as the description proceeds. The required deviations will determine a suitable value for $f$. Separate frequency modulators 7, 8, 9 are provided for the separate sources 2, 3, 4 and separate oscillators 10, 11, 12, all of mean frequency $f$, and the same maximum peak deviations $\Delta f$, in response to a given modulating signal amplitude. The ouputs of the several modulators 5, 7, 8, 9 are applied to an operational adder 14, and the combined outputs are amplified in a single amplifier 15, designed to handle sufficient band-width to accommodate the frequency deviations $\Delta f$, at the mean frequency $f$, and to provide sufficient output voltage and power to effect writing.

The output of amplifier 15 appears on terminal 16. Connected in parallel to terminal 16 is a plurality of series resonant filters 20, 21, 22, 23, . . . each consisting of a condenser 30 and an inductance 31. One filter is provided for each of styli or electrodes 32, 33, 34, 35, . . . . The styli are connected severally to the junctions of the condenser and inductance of the filters. The recited connections of the styli provides that the resistance of electro-sensitive recording paper 36 is not in series with the filters, which is desirable since the recording paper may have a resistance of 100,000 ohms under each stylus, and placing the paper in series with the circuits would reduce the Q factors of the circuits unduly. Circuit Q of 200 is readily possible by virtue of the recited configuration, if the impedance of amplifier 15 as seen from terminal 16 is sufficiently low. Moreover, the voltages at the stylus are higher by a factor Q than the applied voltage, whereby the voltage required at terminal 16 may be quite low. For example, about 70 v. is required for writing, at 10 inches per second paper feed speed, yet this writing speed can be attained with input voltage at terminal 16 of only a few volts. When recording takes place the resistance of the paper decreases to perhaps 10,000 ohms. This reduces the Q of the circuit associated with the writing stylus. When the Q decreases the writing voltage decreases, and writing may cease. Thereupon the Q increases, and the writing voltage increases. The increase and decrease is rapidly cyclic, at high speed, so that writing appears continuous to the naked eye.

Under the recording paper 36, for which Teledeltos paper is satisfactory, is placed a platen 40, the paper contacting the platen 40 and being contacted by the styli 32, 33, . . . with light pressure. Between the platen 40 and ground is conected an inductance 41 of relatively low impedance. Across the inductance 41 is connected a tuning condenser 42 and an A.-C. source 43, in series. The frequency of source 43, having relatively high internal resistance 44, may be different from $f$, either more or less, by perhaps 1 or 2 mc. The platen 40 accordingly varies in voltage with respect to ground, positively and negatively in sequence, and the voltage so applied is called a bias voltage, since it may be selected to approach close to but not to attain writing voltage, and thus reduces the voltage required at the styli to effect writing. Assuming a required writing voltage of 70 v. for a given paper speed, the peak to peak bias voltage at the stylus may be 50 or 60 volts. The styli 32, 33, . . . are then required to supply the difference between the peak to peak bias voltage and the writing voltage, i.e. 10 or 20 volts.

Clearly, the system may operate with or without bias voltage, although in the absence of bias voltage higher signal level must be applied to the styli than when bias voltage is provided, moreover, the bias circuit may be tuned, as indicated, but need not be. If not, the source 43 need not be independent but may be the amplifier 15, i.e. the same source may be employed for both writing and bias. In the alternative, the inductance 41 may be so broadly tuned that amplifier 15 may provide bias, despite the frequency excursions of its output.

Figure 3:
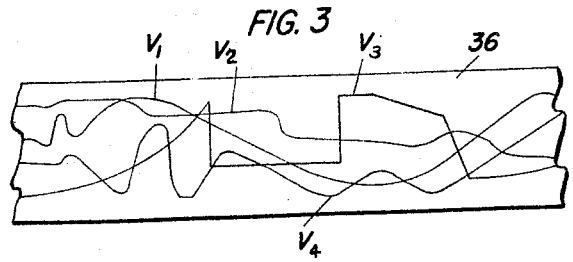
Figure 3 is a representation of a multiple recording, or produced by the systems of Figures 1 and 2.

It will be noted that any number of signal sources 1, 2, 3, 4 may be employed, and that the recording system will accommodate all of these. A typical recording is that of Figure 3, where the several traces are labelled according to the sources from which they derive.

The several filters 20, 21, 22, 23, . . . are selected to have adjoining resonant frequencies, in order, so that the array of filters covers the band $f \pm \Delta f$ to which it may be subjected. The resonant frequencies may be evenly spaced, or may be unequally spaced to compensate for modulator non-linearity, and the values of Q, and frequency spacing $df$ between adjacent filters are selected according to one of several operating modes, hereinafter described. The philosophy on which the choices are predicated is also hereinafter discussed, on a quantitative basis.

The circuit L is a two-way limiter or clipper, including back-to-back diodes 50, 51 biased in opposite senses by properly poled sources 52, 53, and serves to limit writing voltage at the styli to values for which a maximum required, desired or safe density of recording is not exceeded.

Figure 2 discloses a modification of the system of Figure 1, wherein the condensers 30$a$ are connected in series with the styli, as 32, and the inductances 31$a$ between the platen 40 and ground. In the system of Figure 2 the source of writing signal may supply full writing voltage to the styli, the resonant circuits serving only the function of selecting frequency. Since the writing paper is now in series with the resonant circuits the Q factors of the circuits will be low. This result is required for some applications, but in general the configuration of Figure 2 serves to clarify the advantages of the system of Figure 1.

On the other hand, the inductances 31$a$ may be driven simultaneously by bias voltage applied to platen 40, from a single source 43$a$. The latter may be in series with a tuning condenser 42$a$, resonant with all the inductances 31$a$, taken in parallel.

Figure 7:
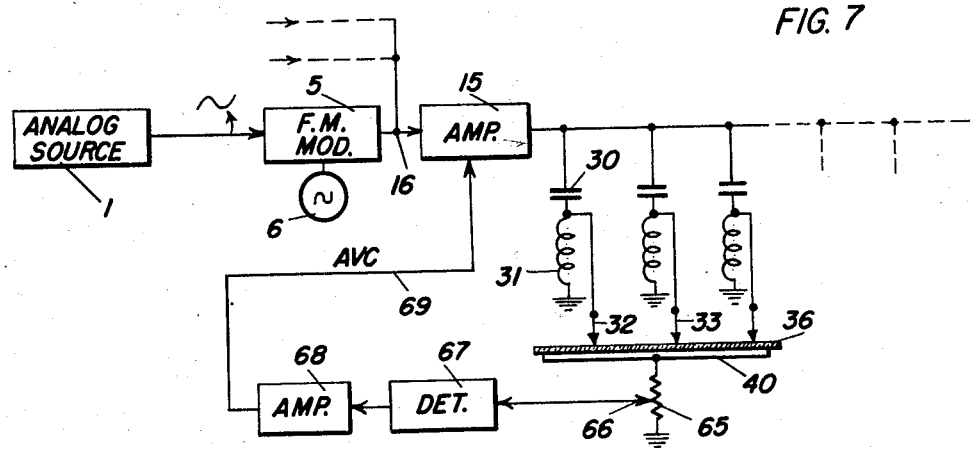
Figure 7 is a circuit diagram, partly in block and partly schematic, or a recorder according to the invention, employing pulse AVC.

The system of Figure 7 is similar to that of Figure 1, and is intended to illustrate a device applicable to the system of Figure 1, or any other figure of the drawings which illustrates a recording system. Specifically, a relatively low resistance 65 (up to 1K) may be connected between platen 40 and ground. A variable tap 66 is taken from resistance 65, and applies signal to a detector 67 and an amplifier 68. The output of the latter is applied as AVC voltage to amplifier 15 via lead 69. The AVC voltage is so poled as to reduce the gain of amplifier 15 in response to an increase of voltage at tap 66.

In operation, while the recording paper 36 is not being written on, or is intact, its resistance is high. Recording is a breakdown process, at the recording paper, and the resistance of the paper decreases by a factor of perhaps 10. It is therefore desirable that the writing current be reduced at that time. However, as paper is fed past the styli, the new paper is not broken down, so that high gain is again needed for recording. The AVC voltage required is, therefore, of the pulse or rapid response type. Fast AVC circuits are well known, and any available circuit may be utilized which will respond with sufficient rapidity to current increases in resistance 65 to prevent burning, while recovering with sufficient rapidity when a new paper element is available for recording, to prevent gaps in the recorded lines.

Figure 8:
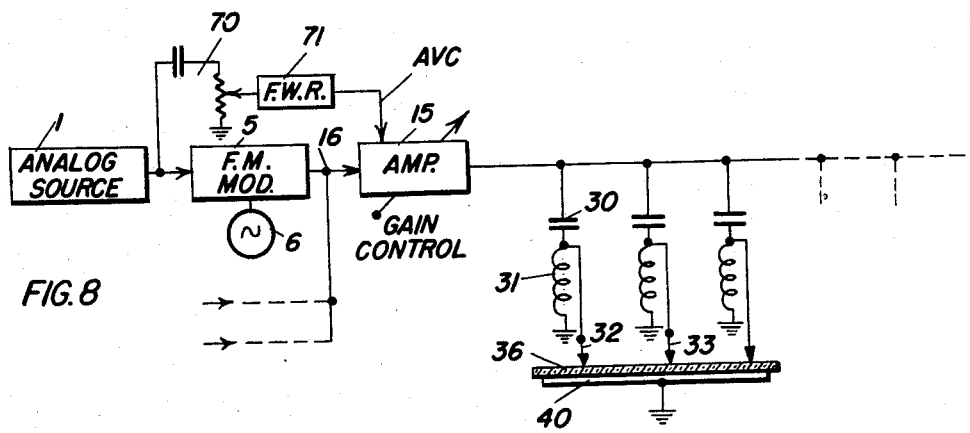
Figure 8 is a modification of the system of Figure 7 employing AVC responsive to writing speed.

The system of Figure 8 is generally similar to that of Figure 7, except in that the gain of amplifier 15 is controlled from analog voltage source 1. The output of the latter is differentiated in differentiator 70, the differentiated voltage rectified in full wave rectifier 71, and the rectified signal employed as AVC voltage to amplifier 15, so poled that the gain of amplifier 15 increases with increase of frequency or rate of change of the signal provided by source 1. It is well known that higher writing voltage and current is needed for higher writing speeds. The AVC voltage is designed to compensate for the instantaneous value of writing speed, so as to supply adequate power at higher writing speed, but at low writing speeds, to keep the writing voltage down below burning levels, or at levels which will provide no more than a desired density of recorded line.

Figure 9:
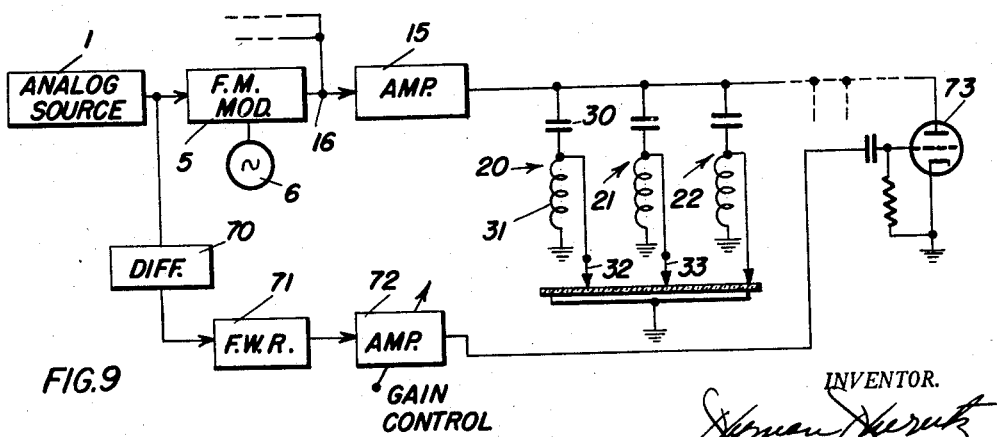
Figure 9 is a modification of the system of Figure 7 which employs selectivity control for the writing filters.

In Figure 9 the output of full wave rectifier 71 is amplified in amplifier 72 and applied to a loading triode 73, which is connected in shunt to all the resonant circuits 21, 22, 23, . . . . As the rate of change of voltage output at source 1 increases the resonant circuits are loaded more and more, by triode 73, which decreases their Q and enables them to respond more rapidly to a signal scanned through their resonant frequencies.

Figure 10:
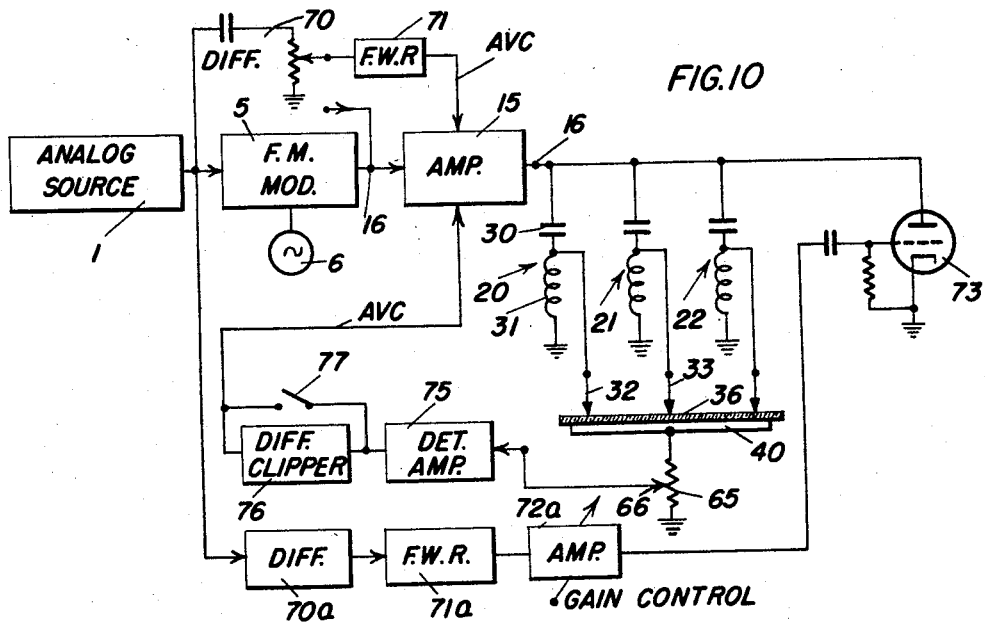
Figure 10 is a system, illustrated largely in block form, which combines the several features of Figures 7 to 9, inclusive.

In the system of Figure 10 the devices of Figures 7, 8 and 9 are simultaneously employed. The Q control triode 73 is controlled by differentiator 70a in cascade with full wave rectifier 71a and amplifier 72a. The control circuits all then cooperate to provide suitable writing voltage and current at all writing speeds, automatically, and to prevent either burning or too light a recorded trace.

Referring to Figure 10, the differentiated signal may be full wave rectified in full wave rectifier 71, the output of the latter being applied in gain increasing relation to amplifier 15, so that higher output will be provided when higher counting speeds are required.

Similarly, the output of source 1 is differentiated in differentiator 70a, the output of the latter suitably amplified and applied to the control electrode of damping tube 73, in said sense to reduce the resistance of the tube and thus damp the filters 20, 21, 22, . . . when high writing speed is required.

The system of Figure 10 combines the devices of Figures 7–9, inclusive. The AVC voltage developed across resistance 65 is detected and amplified by a full wave rectifier and D.-C. pulse amplifier 75, and the output of the latter optionally differentiated in device 76 prior to application to amplifier 15, the undesired polarity of the differentiated signal being removed by clipping. If desired, the differentiator and clipper may be switched out by switch 77. Accordingly, the gain of amplifier 15 may be reduced in response to passage of writing current through strip 36, which occurs as a phenomenon akin to breakdown or spark-over. In the alternative the AVC voltage may occur in response to the wave front of writing pulses in resistance 65. The output of analog source 1 may be also differentiated in differentiator 70 to drive a signal proportional to the rate of change of the analog voltage.

Figure 11:
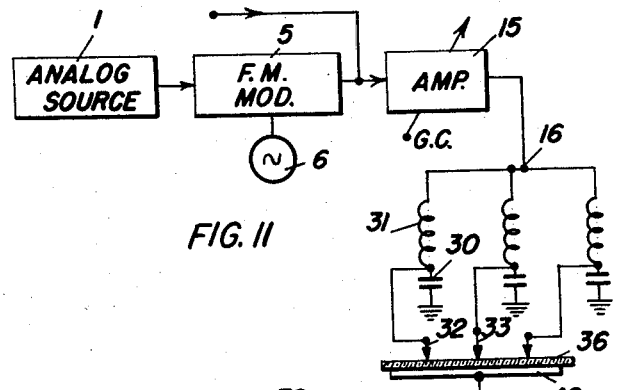
Figure 11 shows schematically a novel arrangement of writing filters.
Figure 12:
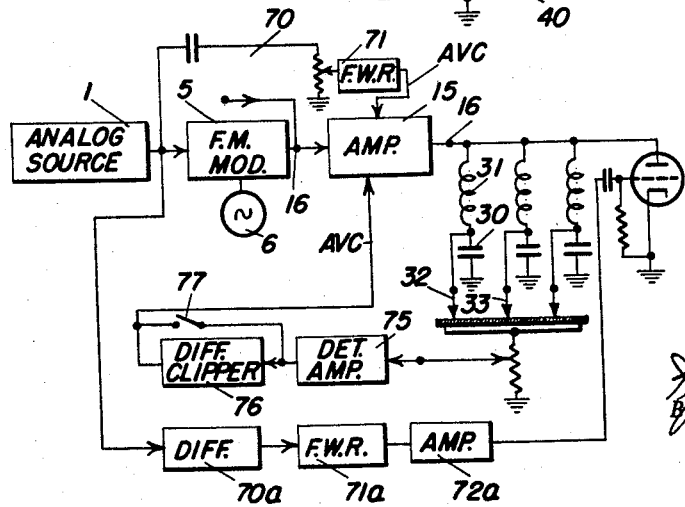
Figure 12 shows a system according to Figure 10 but employing the filter configuration of Figure 11.

The system of Figure 11 provides a modification of the systems of Figures 1–10, which may be incorporated in any of these. The basic change is that the several styli are connected across the capacitors 30 of the filters, instead of across the inductances 31. The system of Figure 12 duplicates that of Figure 10 except for this same modification.

Figure 13:
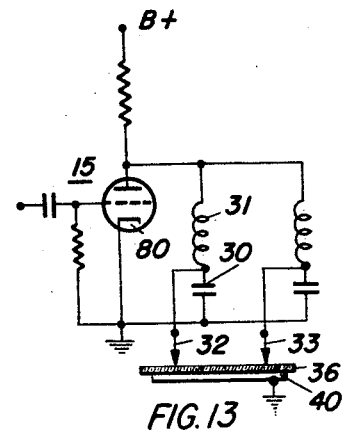
Figure 13 illustrates schematically a writing circuit employing D.-C. bias for the writing styli.

The advantage which accrues by virtue of connecting the filter capacitors between the styli 32 . . . and the platen 40 will become apparent on considering the actual circuitry of one possible embodiment of an amplifier 15, as illustrated in Figure 13. It will be immediately apparent that the capacitors 30 are each changed to the D.-C. level of the anode of amplifier tube 80. The D.-C. voltage across each condenser acts as a bias voltage for the recording paper, and the change due to the D.-C. voltage on the capacitors discharges through the recording paper when the latter breaks down.

It is a problem in direct writing oscillographs of the type herein described to obtain the required circuit Q values for the filters 20, 21, . . . which are reduced by reason of the internal impedance of the driving source or amplifier. To reduce the latter impedance, resort may be had to feed-back such as to reduce driving tube impedance, according to well-known principles. However, it is also possible to employ step-down transformer coupling in the amplifier, the secondary of each transformer being in series with or forming the inductance of the filter, and having a small number of turns, say one. Thereby the impedance of the amplifier tube is transformed, as seen from the selective filters. Obviously, both devices may be simultaneously employed.

The systems of Figures 14–16 illustrate the transformer coupled amplifiers and writing circuits for any of the systems of Figures 1–13. In the system of Figure 14 the output load of amplifier 15 is the primary winding 100 of a transformer 101. Two secondary windings 102, 103 are illustrated, for example only, and it will be appreciated that if desired a separate primary winding may be employed for each secondary winding, the separate primary windings being connected in series or in parallel. If in series the ratio of transformation available may easily be made extremely great, so that impedance looking back from any secondary winding is extremely small. In either case, however, a high step-down ratio is required.

Connected across the separate secondary windings, as 102, 103 are separate tuning condensers, as 104, 105. The styli 32, 33 are connected each to the junction of a series connected condenser and inductance, as 104, 102. The voltage across the condensers then are higher than the voltages induced in the secondaries by the Q factors of the tuned circuits.

In the system of Figure 14 the platen 40 is grounded. A D.-C. voltage source 106 is connected between ground and the common terminal of secondary windings 102, 103, and provides bias voltage, i.e. the value of D.-C. voltage is just below writing voltage.

In the system of Figure 15 a charging resistance 107 is connected in series with D.-C. source 106 and a condenser 108 is connected across the combination. Accordingly, when the system is not writing, so that paper resistance is high, the voltage of condenser 107 is equal to that of source 106. When the paper breaks down under any stylus the condenser discharges rapidly through the stylus and paper, but a relatively slower recharging process also takes place through the resistance 107. In net result the condenser supplies writing current, intermittently, but at high frequency, discharging when the paper breaks down, recharging when a new paper element arrives under the styli, and again breaking down when the new paper element in turn breaks down. This type of bias circuit provides insurance against burning, and also reduces the load on the transformers, which need only supply enough voltage and current to start breakdown, and thereby release the condenser charge.

In the system of Figure 16 the ground point is transferred from the platen 40 to the common connection of the transformer secondaries. This provides the advantage that the tuned circuits are divorced from series relation with any other elements. In Figure 15 the condenser 108 is in series with all the tuning condensers, and its value must be considered in frequency selection.

If desired, the voltage variations across resistance 107, or any part thereof, may be transferred as AVC signal to amplifier 15 to reduce gain during breakdown of the paper. In such case condenser 110 blocks the D.-C. voltage.

The philosophy on which is based the design of systems according to the invention is, briefly, as follows.

Assume that $n$ is the number of filters in a recording system, and $af$ the width of each filter at the half power points. Assume further that F is the highest frequency of the amplitude varying signal to be recorded. In recording a single cycle of frequency F, the total time available is $$\frac{1}{F}$$

and $2n$ filters must be scanned over. Hence the average time per filter is $$\frac{1}{2Fn}$$

The filter band width must then be at least 2nF, for each filter. The total frequency S scanned over in a cycle is $2n^2F$, or the deviation of frequency from its mean value $\Delta f$, is $n^2F$.

Assume 50 filters and a value of $F=1,000$ c.p.s. Each filter must have a band width of $2nF=100,000$ c.p.s. The total frequency deviation $\Delta f$ is 5 mc. If the value F is to be increased to 2 kc. $\Delta f$ is 10 mc. and the filter band width $f=200$ kc.

Figure 4:
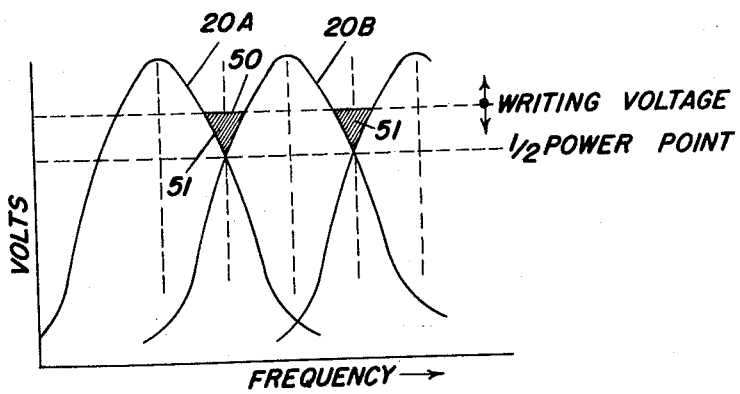
Figure 4 is a plot of a set of filter responses for the system of Figures 1 and 2.

The relationships hereinabove described, for the value S, is calculated on the basis that the several stylus filters cross at their half power points. The responses of the filters are illustrated in Figure 4, wherein 20A is the response of filter 20, 20B the response of filter 21, etc. The required writing voltage may fall at the half power points, or above, i.e. at the line 50. In the latter case transfer of writing signal from one filter to another is accompanied by a gap in writing, as at 51 (shaded area). Hence the writing voltage must fall approximately at the cross-over points of the filters.

It is necessary to consider how it may be possible to reduce the value of S, and also the value of $f$, i.e. to decrease the total frequency deviation required and also to permit high values of Q, which requires low deviations and a low mean carrier value, as well as providing other advantages.

Figure 5:
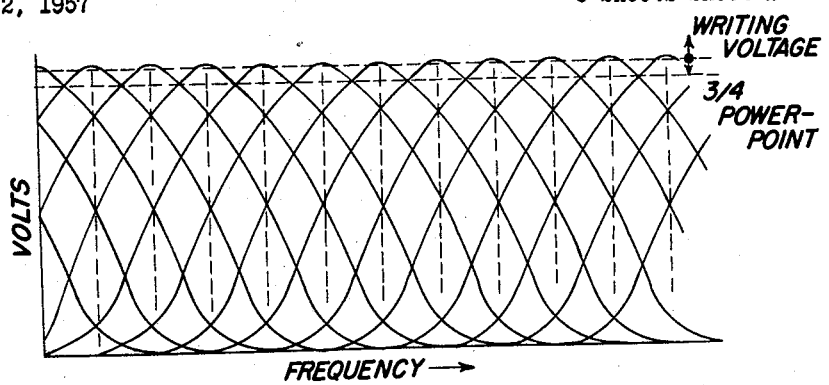
Figure 5 is a plot of a set of modified filter responses for the system of Figures 1 and 2.

The first device employed is to crowd the filters, so that their cross over points occur at points higher on the filter characteristics than the half power points. For example, the ¾ power points may be employed, or the .9 power points (Figure 5). This leads to the possibility that two styli will write simultaneously. This leads to overlap in time of the visual inductions 55 (Figure 17) produced by separate filter. For any reasonable slope of the recorded curve, and paper feed speed, the overlaps will not be objectionable, or in fact readily detectable to the naked eye. Insofar as observable, however, the relative densities of the two recorded lines enables interpolation of analog voltage value, hence increases the accuracy of the system for a given number of styli.

Figure 6:
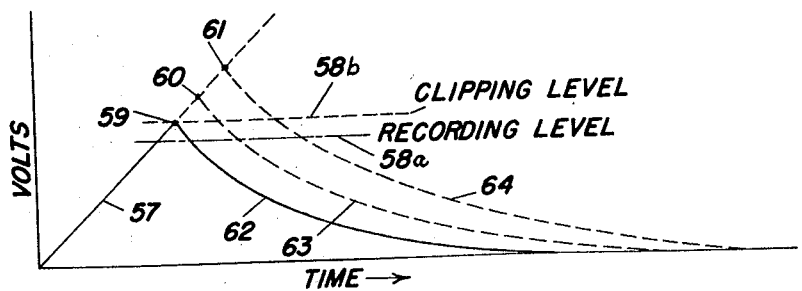
Figure 6 is a plot of transient response of one of the filters of Figures 1 and 2.

An alternative, or supplementary device which may be employed is to employ a recording voltage far above that required for writing and a band width $\alpha f$ for the separate filters far below that required for the maximum writing frequency F. The separate filters then do not have time to achieve full response to the applied writing current in the time allotted for the writing signal to scan through the filter, yet adequate to achieve sufficient response to effect writing. In Figure 6 the line 57 represents the rise of a single filter response. It will be noted that the response is substantially linear. Line 58a represents writing level, and points 59, 60, 61, the values for which a signal has passed through the peak frequency of the filter response. After such point has been passed the response of the filter decays logarithmically to zero, as at 62, 63, 64, if writing speed is sufficiently high. Clipper or limiter L may be set to value 58b.

If the curve 57, 59, 62 represents the build up and decay of a filter at maximum value F, the curve 57, 60, 63 represents the build up and decay of a filter for a smaller value of F, and the curve 57, 61, 64 for a still smaller value. For a sufficiently low frequency of input analog voltage the filter may attain full response, which may prove excessive and burn the recording paper. The clipping circuit L prevents this.

Employing the devices specified, for reducing required frequency sweep and for increasing circuit Q values, has resulted in approximate design parameters as follows.

$S=.5$ mc.
$\alpha f=25$ kc.
$F=2000$ c.p.s.
$Q=200$
$n=50$ at a mean carrier frequency of $f=5$ mc.

The devices immediately hereinabove described for reducing frequency scan requirements may be employed in any of the systems of Figures 1, 2, 7–19, inclusive.

The systems of Figures 17 and 18 are provided to indicate that the filters may be driven from a transistor 112, or from a cathode follower 113.

It is a distinct advantage of the present system that if the modulating circuit cannot readily be made linear, i.e. so that analog voltage is directly proportional to frequency, the writing filters may be compensatively spaced, so that as the analog voltage rises linearly recording will transfer from stylus to stylus at equal time intervals.

While I have described and illustrated one specific embodiment of the present invention, it will become apparent that variations of the specific details of construction may be resorted to without departing from the true spirit and scope of the invention as defined in the appended claims.

What I claim is:

1. A writing circuit for writing on moving electro-sensitive paper, said writing paper requiring at least a predetermined writing voltage, comprising a first series resonant circuit, a second series resonant circuit, a first electrode contacting said paper on one side, a second electrode contacting said paper on said one side, a common electrode contacting said paper on the other side, means for applying to said common electrode voltage varying with respect to a reference point with peak to peak excursions of alternately positive and negative value of one frequency, means for applying to each of said styli voltages at two other frequencies with excursions of alternately positive and negative voltage with respect to said reference point, the peak to peak excursions of said voltage of said common electrode being less than said writing voltage for said paper but adjacent to said writing voltage.

2. An oscillographic recorder for writing on electro-sensitive recording paper comprising an array of electrodes on one side of said paper, an array of resonant circuits each resonant to a different but adjacent frequency, each circuit connected to one only of said electrodes in energizing relation thereto, a plurality of separate amplitude varying signal sources, frequency modulating means for converting each amplitude varying signal to a corresponding frequency varying signal, the frequency variations of said frequency varying signals occupying a common frequency band co-extensive with the frequency band occupied by said array of resonant circuits, and means for simultaneously applying said frequency varying signal to all said resonant circuits.

3. The system according to claim 2 wherein said resonant circuits are series resonant circuits including each a reactance of one sign and an equal reactance of opposite sign, and means for connecting each of said electrodes to a different one of said resonant circuits at the junction of the reactances of opposite sign pertaining to that resonant circuit.

4. The combination according to claim 3 wherein is provided a platen underlying said paper and electrodes, and means for varying the voltage of said platen at radio frequency to a value approaching but less than writing voltage for said paper.

5. A system for recording on time fed electro-sensitive paper, comprising an electrode in contact with said paper, a resonant circuit connected to said electrode in energizing relation thereto, said resonant circuit having a predetermined rise time to X percent of peak value in response to an applied signal at the frequency to which said circuit is resonant, a frequency modulated signal scanning through the response frequencies of said resonant circuit, and means for imparting to said frequency modulated signal a maxmium rate of frequency variation $$\frac{df}{dt}$$

sufficiently slow to permit the value of said rise time to be $$\frac{X}{a}$$

percentage, and for imparting to said frequency modulated signal an amplitude such that at $$\frac{X}{a}$$

percentage of its peak value said electrode attains writing voltage at the feed speed of said electro-sensitive paper, where X and $a$ may have any pre-selected positive values from 1 to and including 100.

6. The combination according to claim 5 wherein X is at least 95.

7. The combination according to claim 5 wherein X is 100 and $a$ is less than 2.

8. The combination according to claim 5 wherein X is 100 and $a$ is less than 4.

9. The combination according to claim 5 wherein X is 100 and $a$ is less than 10.

10. A system for generating a visual display on a voltage sensitive element, said element having a relatively high normal resistance and a relatively low resistance only during generation of said display in response to a voltage, a gain reducible amplifier supplying said voltage to said sensitive element, said amplifier having a normal gain and means responsive to generation of said display in response to said voltage for substantially reducing said normal gain.

11. A circuit for generating a visual display on a voltage sensitive element having a firing voltage level at which visual display is generated electrodes on either side of said element and in contact therewith, a series resonant circuit having a condenser and an inductance in series, said circuit being resonant to a predetermined frequency, means connecting said electrodes across said condenser, an amplifier for providing signal at said frequency, said amplifier having a direct current output circuit arranged to provide said signal in superposition of a predetermined direct voltage level, and means connecting said output circuit in series with said resonant circuit.

12. A circuit for generating a visual display on an electro-sensitive element, said element having a firing voltage below which no display is produced, electrodes on either side of said element and in contact therewith, a condenser connected across said electrodes, means charging said condenser to a direct voltage substantially smaller than said firing voltage, and means for effecting alternating current flow through said condenser of amplitude sufficiently great when superposed on said direct voltage to provide said firing voltage across said element.

13. A system for recording the instantaneous amplitudes of an amplitude varying signal, said system for recording including a multiple stylus recorder for writing on electrosensitive recording paper, means energizing said styli selectively to write including a gain variable amplifier for supplying writing voltage to all said styli, and means for varying the gain of said amplifier as a direct function of the rate of amplitude variation of said amplitude varying signal.

14. A system for recording directly on electrosensitive recording paper, comprising two separated and opposed electrodes in contact with said paper, an impedance connected between one of said electrodes and a reference point, a series resonant circuit having an inductance and a capacitance, means connecting said electrodes across one only of said inductance and capacitance, a gain controllable amplifier for randomly supplying to said resonant circuit transient signal of a frequency to which said series circuit is resonant, said amplifier having an output circuit connected across said series resonant circuit, and means for decreasing the gain of said amplifier in response to increase of voltage across said impedance.

15. In a multiple stylus recorder for recording on electrosensitive recording paper, a source of amplitude varying analogue voltage, a frequency modulator, an oscillator, means including said frequency modulator for varying the frequency of said oscillator in response to said amplitude varying analogue voltage over a frequency spectrum such that each different instantaneous amplitude corresponds with a different instantaneous frequency, a plurality of electrodes in an ordered array and each contacting said paper at a different transverse point thereof, a separate band-pass filter connected in writing relation to each of said contacts, each of said filters having a different pass band, the pass bands together extending over said frequency spectrum, means for varying the Q factors of all said filters simultaneously in response to a control voltage, and means for developing said control voltage as a function of the rate of amplitude variation of said amplitude varying analogue voltage.

16. A multiple stylus recorder for recording on electrosensitive recording paper, comprising a plurality of separate writing contacts in series with said paper, a separate writing circuit connected with each of said writing contacts, each of said writing circuits including a condenser, a common return electrode for all said styli, said common return electrode located in contact with said paper and in proximity to said writing electrodes, each of said condensers being connected between one of said writing electrodes and said common electrode, a source of direct bias voltage, means connecting said source of direct bias voltage in parallel across all said condensers, and signal responsive means for transiently additively superposing voltage on the direct voltage across any selected one of said condensers.

17. In an indicating system, a signal responsive visual indicator having a minimum signal level at which a visual indication is generated by said indicator, a narrow band filter connected to said visual indicator, means for applying wide band frequency modulated signal to said visual indicator via said filter at amplitude level adequate to provide said signal level at said visual indicator while said frequency modulated signal is varying in frequency at a relatively low rate, and means for supplying said wide band frequency modulated signal to said narrow band filter at a higher level while said frequency modulated signal is varying in frequency at a relatively high rate.

18. In an indicating system, a source of randomly amplitude varying signal, means for converting said amplitude varying signal to a wide band frequency varying signal having the same information content as said amplitude varying signal, a narrow band filter responsive to said wide band frequency varying signal, means for varying the time constant of said filter in response to a control voltage, means for differentiating said amplitude varying signal to derive said control voltage, and means for applying said control voltage to said means for varying the time constant of said filter in such sense and amplitude as to provide a time constant for said filter which is an inverse function of the rate of amplitude variation of said amplitude varying signal.

19. A multi stylus recorder, comprising an ordered array of writing electrodes, means for energizing said writing electrodes comprising a different band-pass filter in energizing relation to each electrode, the pass-bands of said filters being ordered in the same relation as the location of the electrodes in the array of electrodes, and means for scanning a randomly frequency modulated writing signal across the pass bands of said filters in sequence, said filters having each a pass band substantially less than 1.5

$$\sqrt{\frac{df}{dt}}$$

where $$\frac{df}{dt}$$

is the rate of frequency scan of said writing signal in cycles per second per second, for the greatest value of $$\frac{df}{dt}$$

to which said filters are subject.

20. A multi-stylus recorder comprising an ordered array of writing electrodes, means for energizing said writing electrodes comprising a different band pass filter in energizing relation to each electrode, the pass bands of said filters being ordered in the same relation as the location of the electrodes in the array of electrodes, and means for scanning a frequency modulated writing signal across the pass bands of said filters in sequence, said filters having each a pass band of less than $$\sqrt{\frac{df}{dt}}$$

where $$\frac{df}{dt}$$

is the maximum rate of frequency scan of said writing signal in cycles per second per second, said writing electrodes requiring a predetermined minimum voltage to accomplish writing, the Q factors of said filters and the amplitude of said writing signal being selected to assure attainment of said minimum voltage at said electrodes during said scanning at the rate $$\frac{df}{dt}$$

21. In a recorder comprising a pair of electrodes between which moves an electrosensitive recording strip, the combination of an energizing circuit for said electrodes comprising an amplifier having a vacuum tube, said vacuum tube having an anode and a cathode, an anode resistance, a source of anode voltage in series with said anode via said anode resistance, a filter comprising an inductance and a capacitance, said filter being resonant to a frequency $f$, said filter having two end electrodes and a junction terminal, said junction terminal joining said capacitance to said inductance, means connecting said filter between said anode and said cathode, and means connecting said electrodes across said capacitance, said electrosensitive strip requiring a minimum firing voltage across said electrodes for recording to occur, the direct voltage of said anode being only slightly less than said firing voltage, and means for supplying signal at frequency $f$ to said amplifier for amplification thereby to a level exceeding the difference between said writing voltage and the voltage of said anode.

References Cited in the file of this patent

UNITED STATES PATENTS

| | | |
|---|---|---|
| 2,279,659 | Crosby | Apr. 14, 1942 |
| 2,315,362 | Wise et al. | Mar. 30, 1943 |
| 2,501,791 | Silverman | Mar. 28, 1950 |
| 2,639,209 | Gamarekian | May 19, 1953 |
| 2,659,650 | MacDonald | Nov. 17, 1953 |
| 2,698,928 | Pulvari | Jan. 4, 1955 |
| 2,769,680 | Beck | Nov. 6, 1956 |